US006910658B1

(12) United States Patent
Hart et al.

(10) Patent No.: US 6,910,658 B1
(45) Date of Patent: Jun. 28, 2005

(54) UNDERWATER DETECTION SYSTEM

(75) Inventors: David Hart, Bristol (GB); Robert L. Cooke, Bristol (GB)

(73) Assignee: BAE Systems PLC, London (GB)

( * ) Notice: Subject to any disclaimer, the term of this patent is extended or adjusted under 35 U.S.C. 154(b) by 1826 days.

(21) Appl. No.: 07/456,817

(22) Filed: Dec. 8, 1989

(30) Foreign Application Priority Data

Dec. 8, 1988 (GB) .............................................. 8828680

(51) Int. Cl.⁷ .............................................. F41G 7/00
(52) U.S. Cl. ................................... 244/3.12; 114/21.3
(58) Field of Search ..................... 244/3.12; 114/21.2, 114/21.3

(56) References Cited

U.S. PATENT DOCUMENTS

| 3,161,168 A | * | 12/1964 | Rebikoff | 114/21.2 |
| 3,506,967 A | * | 4/1970 | Foley | 114/21.3 |
| 3,613,619 A | * | 10/1971 | de Nobel | 114/21.2 |
| 3,643,616 A | * | 2/1972 | Jones | 114/21.3 |
| 4,611,771 A | * | 9/1986 | Gibbons et al. | 244/3.12 |
| 4,770,370 A | * | 9/1988 | Pinson | 244/3.12 |
| 4,860,968 A | * | 8/1989 | Pinson | 244/3.12 |

* cited by examiner

Primary Examiner—Michael J. Carone
(74) Attorney, Agent, or Firm—Nixon & Vanderhye P.C.

(57) ABSTRACT

An anti-torpedo torpedo having laser homing head, the torpedo being launched from a parent vessel or platform which itself houses the expensive to replace, the bulky, or the high power consuming parts of the laser, said parts being optically connected to an optical projector in the homing head in the torpedo itself and to any parts of the laser not housed in the parent vessel.

9 Claims, 1 Drawing Sheet

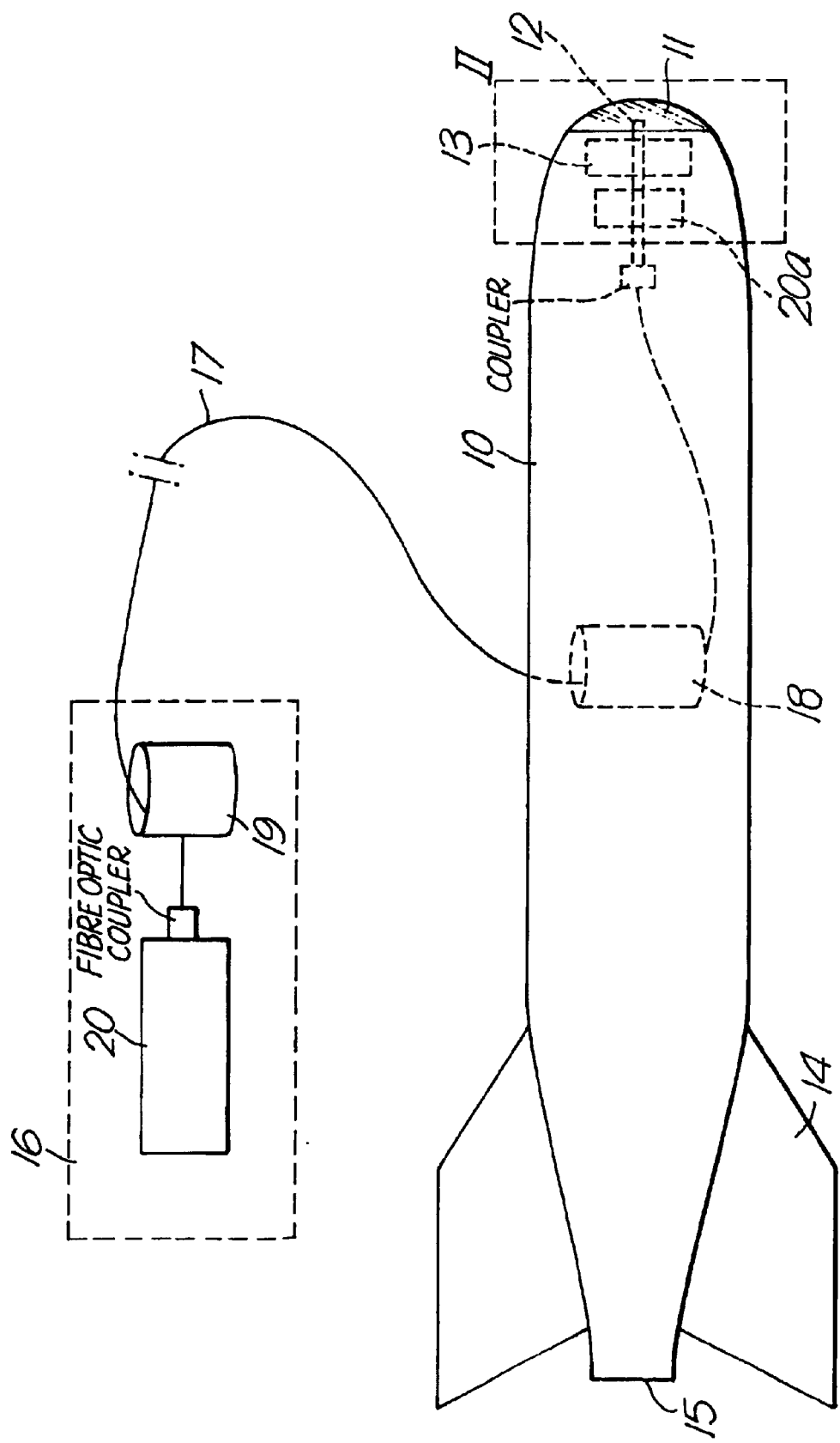

UNDERWATER DETECTION SYSTEM

This invention relates to underwater detection systems suitable for use in weapons systems capable of intercepting an approaching torpedo. The weapon systems include an underwater weapon, and a parent vessel or platform, the system having guidance means including a laser, preferably emitting light in the blue/green spectral bands. Underwater laser light is rapidly scattered and becomes incoherent; this limits the range at which a target can be detected to a few hundred meters depending upon the output powers of the laser, but assuming that the weapon can be brought to within that range, then a laser guidance system of type having light projection means and light detection means to detect the reflection from a target can be utilised.

Several prime advantages accrue from such a laser guidance system.

1. Because the speed of light is about $2.10^8$ m/s in water the delay due to projection to the target and the reflection back (the propagation delay) is insignificant, and the rate at which data can be acquired is limited only by the laser pulse rate.
2. Since the propagation delay is of the order of nanoseconds or microseconds even a freely rolling weapon will not move significantly in this period. There is no requirement for weapon roll position control and the weapon is thus simplified.
3. An imaging detector can be utilised to improve countermeasure resistance and target characterisation.
4. The system is likely to be relatively unaffected by hydrodynamically induced noise and can allow relatively high speed operation.

According to the present invention, an underwater detection system having an underwater guided vehicle, a parent vessel (either a surface or an underwater vessel) or platform and detection means for detecting underwater objects, the detecting means including a laser light generating means, means to direct the light so generated towards an underwater object, and detector means to receive the reflection from said underwater object, at least some parts of the laser light generating means being carried by the parent vessel or platform and at least the directing means and the detector means being carried by the underwater vehicle, those parts of the laser light generating means carried by the parent vessel or platform being operatively connected to the directing means and to any parts of the laser light generating means carried by the underwater vehicle by optical fibre cable means.

By this arrangement any expensive, bulky or high power consuming parts of the laser light generating means can be mounted in the parent vessel thereby reducing the size and cost of replacement of the underwater vehicle.

Typically laser which could be used in the light generating means are a frequency doubled Nd-yag laser (532 nm), a mercury bromide laser (502 nm) or a Raman shifted XeCl laser (500 nm).

Advantageously, in the case of the Nd-yag laser, which has a basic wavelength of 1.06 um, if carried by the parent vessel can have its frequency doubling crystal carried in the underwater vehicle. This allows the light transmitted by the optical fibre to be in or close to the lowest loss band of current optical fibres which occurs at the near infra red wavelength.

In the case of the Raman shifted XeCl laser, the material of the optical fibre may be selected so that it acts as a Raman convertor for the laser.

In a further embodiment it is suggested that, for example in the case of Nd-yag laser, both the yag crystal (i.e. the laser rod) and the frequency doubling crystal could by carried by the underwater vehicle whilst the high power absorbing pulsed lighting used for stimulating the yag crystal into resonation is carried by the parent vehicle, and the pulses passed to the crystal via the optical fibre.

One embodiment of the invention as applied to an anti-torpedo underwater weapon system is described by way of example with reference to the accompanying drawing which is a diagrammatic representation of the system.

An underwater vehicle, in this case a weapon is illustrated at 10. It comprises a generally cylindrical body with a transparent window II in the nose behind which lies an optical projector 12 and and imaging system 13. The choice of guidance enables the weapon to operate without roll control; it needs therefore only fixed stabilising fins 14 together with a single nozzle rocket motor 15 for propulsive power. Directional control is by thrust vector control e.g. by swivelling the nozzle of the motor 15.

The underwater vehicle 10 is associated with a parent vessel or platform 16 shown only in broken outline by way of information. A fibre optic cable 17 extends between the vehicle 10 and the vessel 16, each preferably having a dispenser reel 18, 19 respectively from which the cable 17 unwinds as the vehicle 10 moves away from the vessel 16.

Laser light generating equipment is carried in the vessel 16. It is connected via an optical coupler, the fibre optic cable 17 to an optical projector 12, which may be merely the polished end face of the optical cable 17 suitably located within the nose region of the vehicle 10.

The optical cable 17 extends along the centre line of the vehicle 10 and terminates just aft of the transparency 11 in the polished end face which forms the optical projector 12.

In use the laser light generator in the parent vessel 16 provides a series of intense, coherent, light pulses via the optical cable 17 to the projector 12 and thence to an object for example a torpedo, which requires to be intercepted. Any variations in backscatter caused by the presence of a torpedo are detected by the imaging system 13 which includes a lens, a gated intensifier, and an electronics package which deciphers the image received and passes steering correction signals to the thrust vector control system (not shown). These items are conveniently mounted coaxially with the optical fibre table 17.

To provide scanning of the target area in one or more planes, an oscillating optical wedge is positioned in the optical path between the lens and transparency.

The described embodiment envisages all the equipment associated with the laser light generator 20 to be carried in the parent vessel 16. However as previously discussed there is advantage in certain circumstances for some of this equipment (e.g. frequency doubling crystals or YAG crystals) to be removed from the vessel 16 and placed in the underwater vehicle 10 for example at reference 20a in the figure.

What is claimed is:

1. An underwater detection system having an underwater guided vehicle, a parent vessel which can be a surface vessel or an underwater vessel or a platform, and detection means for detecting underwater objects, the detection means including a laser light generating means, means to direct the light so generated towards an underwater object, and detector means to receive a reflection from said underwater object, at least some parts of the laser light generating means being carried by the parent vessel and at least the directing means and the detector means being carried by the underwater vehicle, and optical fiber cable means for operatively connecting those parts of the laser light generating means carried by the parent vessel or platform to the directing means and to any parts of the laser light generating means carried by the underwater vehicle.

2. An underwater detection system comprising:
   an underwater guided vehicle having an optical projector for directing received laser light towards an underwater target, and an optical detector for receiving laser light reflected from the target;
   a laser light generator, remote from said underwater guided vehicle; and
   a light guide for transmitting laser light from said generator to said guided vehicle and coupling said laser light to said guided vehicle as said received laser light.

3. An underwater detection system according to claim 2 in which said laser light generator is incorporated in a parent vessel.

4. An underwater detection system according to claim 3 in which said laser light generator is a Nd-YAG laser, and further comprising a frequency doubler incorporated within said guided vehicle for doubling a frequency of light transmitted from said generator via said light guide.

5. An underwater detection system according to claim 2 which said light guide is a fibre optic cable.

6. An underwater detection system according to claim 5 in which the optical projector is a polished end face of said fibre optic cable located in a nose portion of said guided vehicle.

7. An underwater detection system according to claim 2 in which said laser light generator is a pulsed laser light generator.

8. An underwater detection system according to claim 2 in which said optical detector incorporates a lens, gated intensifier and electronic means for generating a steering correction signal for the guided vehicle in response to received laser light reflected from the target.

9. An underwater detection system according to claim 8 in which the optical detector further incorporates an oscillating optical wedge for scanning of the target.

* * * * *